United States Patent [19]

Matero et al.

[11] Patent Number: 6,115,585

[45] Date of Patent: Sep. 5, 2000

[54] ANTENNA SWITCHING CIRCUITS FOR RADIO TELEPHONES

[75] Inventors: Jorma Matero, Oulu; Matti I Kangas, Oulunsalo, both of Finland

[73] Assignee: Nokia Mobile Phones Limited, Espoo, Finland

[21] Appl. No.: 09/003,345

[22] Filed: Jan. 6, 1998

Related U.S. Application Data

[62] Division of application No. 08/692,496, Aug. 7, 1996, Pat. No. 5,768,691.

[51] Int. Cl.[7] .................................................. H04B 1/44
[52] U.S. Cl. .............................. 455/78; 455/84; 333/101
[58] Field of Search ........................... 455/78, 73, 82–84, 455/575, 132, 272, 99, 129, 345; 370/276, 277, 278, 280, 282, 294; 333/101, 103–104

[56] References Cited

U.S. PATENT DOCUMENTS

| | | | |
|---|---|---|---|
| 4,955,039 | 9/1990 | Rother et al. .............................. | 375/75 |
| 5,079,520 | 1/1992 | Rapeli .................................. | 331/100 A |
| 5,291,474 | 3/1994 | Ikonen et al. ............................. | 370/30 |
| 5,301,367 | 4/1994 | Heinonen .................................. | 455/76 |
| 5,325,075 | 6/1994 | Rapeli ..................................... | 332/103 |
| 5,386,203 | 1/1995 | Ishihara ................................... | 333/129 |
| 5,390,168 | 2/1995 | Vimpari .................................... | 370/30 |
| 5,471,652 | 11/1995 | Hulkko .................................... | 455/76 |

FOREIGN PATENT DOCUMENTS

| | | |
|---|---|---|
| 0305603 A1 | 3/1989 | European Pat. Off. . |
| 0541305 A1 | 5/1993 | European Pat. Off. . |
| 0581573 A1 | 2/1994 | European Pat. Off. . |
| WO 94/14247 | 6/1994 | WIPO . |

*Primary Examiner*—Nguyen Vo
*Attorney, Agent, or Firm*—Ohlandt, Greeley, Ruggiero & Perle, L.L.P.

[57] ABSTRACT

Disclosed are various embodiments of circuitry for coupling first and second transceivers of a dual band radio telephone to integral and external antennas. The circuitry uses impedance matching lengths of transmission lines and switches arranged to provide a minimum insertion loss. Also disclosed is an embodiment for use with a single band radio telephone, such as a digital TDMA radio telephone that either transmits or receives at any given time. Also disclosed is an antenna switching arrangement for a dual band phone that eliminates a requirement for duplexers.

3 Claims, 6 Drawing Sheets

ANTENNA SWITCHING CIRCUITS FOR RADIO TELEPHONES

This application is a divisional of application Ser. No. 08/692,496, filed on Aug. 7, 1996, U.S. Pat. No. 5,768,691.

FIELD OF THE INVENTION

This invention relates generally to methods and apparatus for connecting radio frequency (RF) circuits to one or more antennas and, in particular, to circuits used in single and dual band radio telephones, such as cellular telephones.

BACKGROUND OF THE INVENTION

In a dual band mobile phone the operational bandwidth of the antenna presents a difficult problem. By example, such a mobile phone may need to be operable in the 800 MHz band (e.g., analog AMPS) at one time, and then in the 1.9 GHz band (e.g., digital PCN) at another time. Preferably, a single antenna is used for both bands. However, due to the large difference in operational frequencies conventional dual band mobile phones typically provide a separate receiver front end and a separate transmitter power amplifier section for each band.

Figure 1:
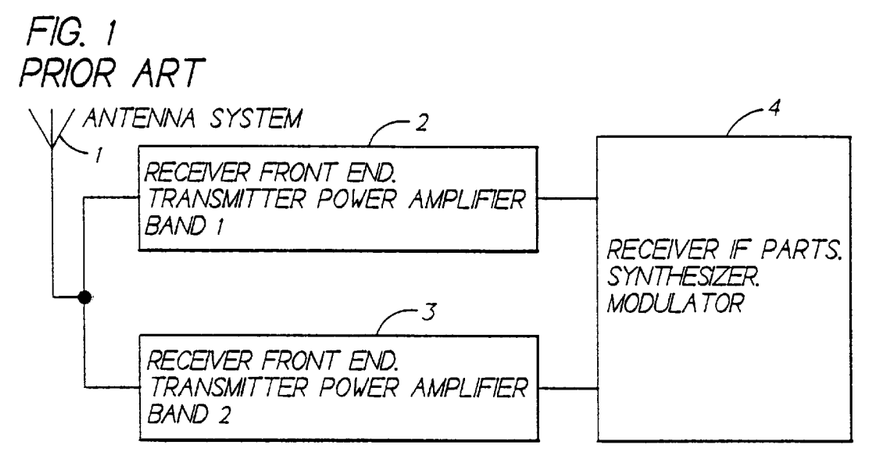
FIG. 1 is block diagram that illustrates a portion of a conventional dual band mobile phone.

FIG. 1 illustrates one such conventional construction for a dual band mobile phone. A single antenna system 1 is connected to a Band 1 receiver front end and transmitter power amplifier block 2, and is also connected to a Band 2 receiver front end and transmitter power amplifier block 3. Blocks 2 and 3 are both connected to a common, further block 4 that contains the receiver IF circuits, frequency synthesizer(s), modulators, demodulators, etc. Not shown in FIG. 1 are the remaining portions of the mobile phone, such as the keypad, display, user interface controller, etc.

Figure 2:
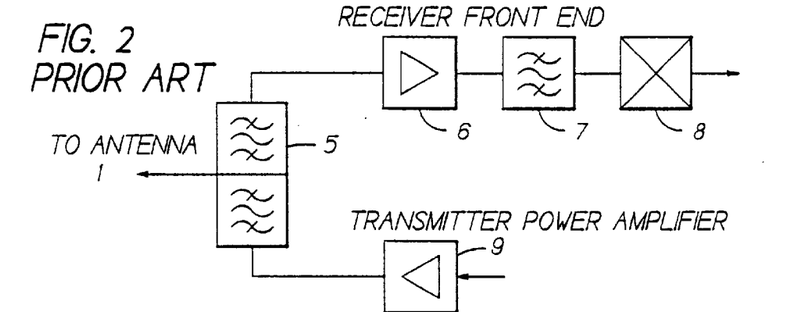
FIG. 2 is a simplified schematic diagram of a conventional receiver front end and transmitter power amplifier that are coupled to an antenna through a duplexer.

In some dual band phones, such as a dual band phone that includes a digital TDMA portion, the TDMA transmitter and receiver sections are connected to the antenna 1 through a duplex filter 5, as is illustrated in FIG. 2. In this case the duplex filter 5 is connected to an input of a receiver amplifier 6, which has an output connected to a bandpass filter 7 and a first IF mixer 8, while also being connected to the output of a transmitter power amplifier 9.

Figure 3:
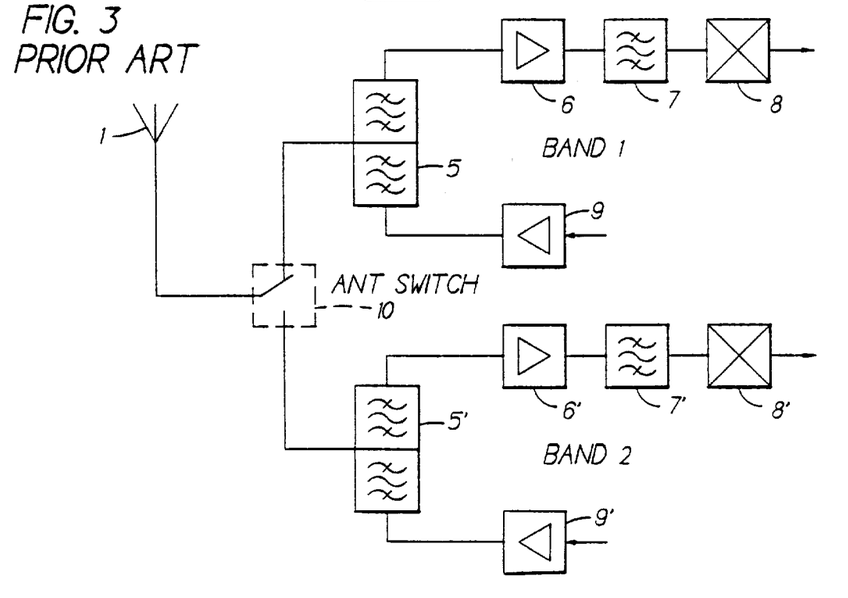
FIG. 3 is a simplified schematic diagram of a portion of a conventional dual band mobile phone that includes two receiver front ends, transmitter power amplifiers, and duplexers that are coupled to an antenna through an antenna switch.

In conventional practice the required band switching has been accomplished with a mechanical relay or switch 10, as is shown in FIG. 3. In FIG. 3 the circuitry shown in FIG. 2 is duplicated for each band, with the Band 2 circuits being designated with prime symbols ('). At any given time the switch 10 connects either the Band 1 or the Band 2 transceiver circuitry to the antenna 1.

However, this approach has at least two significant disadvantages. First, the use of a mechanical switch has the disadvantage of requiring a large and bulky component with a slow switching time. To overcome this problem the mechanical switch can be replaced with an electronic switch, such as a FET or a pin diode. However, the use of an electronic switch is disadvantageous in that it introduces a significant insertion loss into the RF path. A typical insertion loss for an electronic switch is on the order of 0.5 dB. This insertion loss must be compensated for by using a higher transmitter power which, in turn, increases the power consumption and reduces the battery life of the mobile phone. Furthermore, if operation in one of the bands is required to be a duplex analog mode, the antenna switching circuitry must exhibit a high degree of linearity to avoid spurious responses generated by the transmitter signal within the antenna switch 10. Also, the receiver sensitivity is impaired since the switch insertion loss also degrades the receiver noise figure.

One benefit of the approach shown in FIG. 3 is that it provides good isolation between band filters (in this case the duplex filters, or duplexers, 5 and 5'), which thereby enables an optimum performance on both bands. However, the high insertion loss and required linearity can overshadow the benefit of this arrangement, and make its use undesirable for many applications.

Figure 4:
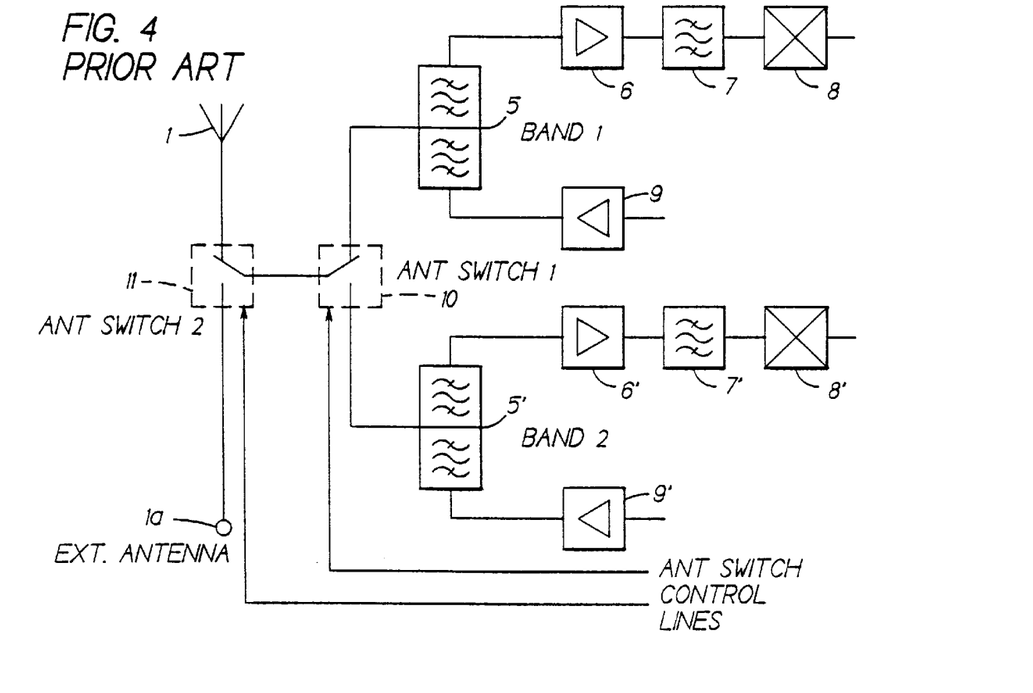
FIG. 4 illustrates a conventional arrangement for coupling the circuitry of FIG. 3 to one of two antennas.

Reference can also be made to FIG. 4 for illustrating a conventional approach for implementing antenna switching in a dual band mobile phone, when an external antenna connector 1a is required. That is, the antenna 1 may be an integral or master antenna that is provided as part of the mobile phone, while antenna connector 1a is also provided to enable the mobile phone to be connected to a second, external antenna. In addition to the Band 1 and Band 2 transceiver circuitry shown in FIG. 3, a second antenna switch 11 is connected in series with the band switch 10, and suitable antenna switch control lines are provided from a controller (not shown) of the mobile phone to control the state of the antenna switches 10 and 11. Assuming that the second switch 11 is also an electronic switch, it can be appreciated that the total insertion loss can be doubled over the FIG. 3 configuration. This in turn compounds at least the power consumption and receiver sensitivity problems that were described above with respect to FIG. 3.

Figure 9:
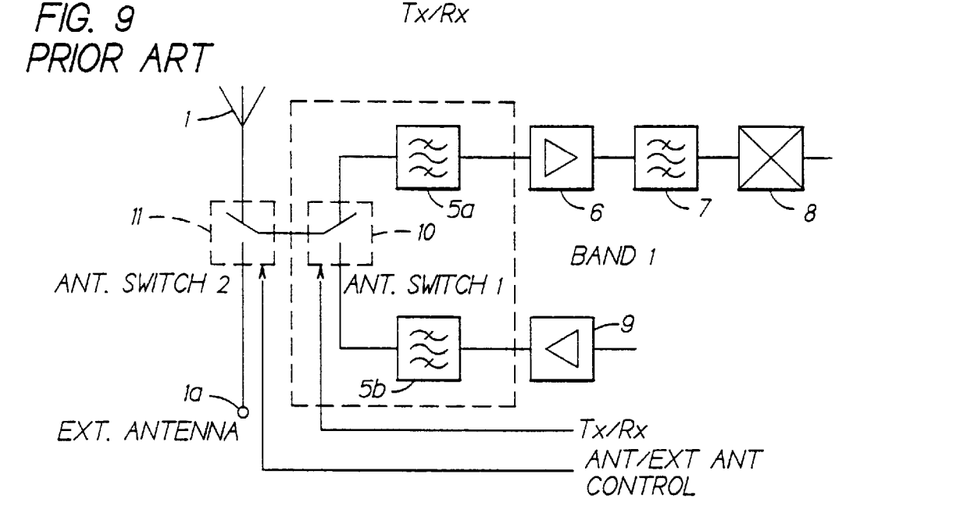
FIG. 9 illustrates a conventional arrangement for coupling to one of two antennas in a single band mobile phone.

FIG. 9 illustrates a conventional antenna/external antenna switching arrangement for a single band digital (e.g., TDMA) mobile phone. The first antenna switch 10 functions as a transmit/receive switch for the receiver and transmitter, and is coupled to a receive bandpass filter 5a and a transmit bandpass filter 5b. The second antenna switch 11 is employed for switching between the antenna 1 and the external antenna connector 1a. As in the embodiment of FIG. 4, a significant disadvantage of this technique is the doubling of the insertion loss due to the two serially coupled antenna switches 10 and 11.

OBJECTS OF THE INVENTION

It is a first object of this invention to provide an improved mobile phone that overcomes the foregoing and other problems.

It is a further object of this invention to provide embodiments of circuitry for coupling both single band and dual band mobile phones to two antennas, and that avoids the doubling of the insertion loss due to the use of two series-connected electronic switches.

It is another object of this invention to provide embodiments of switching circuitry for coupling a dual band mobile phone to two antennas, without requiring a duplexer.

SUMMARY OF THE INVENTION

The foregoing and other problems are overcome and the objects of the invention are realized by antenna switching circuitry in accordance with embodiments of this invention.

In a first embodiment of this invention there is provided antenna switching circuitry for use in a radio telephone of a type that includes a first transceiver operable in a first frequency band and a second transceiver operable in a second frequency band. The radio telephone further includes a first antenna port and a second antenna port. The antenna switching circuitry includes a first pair of transmission lines (L1 and L4) each having a first node coupled to an input/output port of the first transceiver. A second node of L1 is switchably coupled to the first antenna port and a second node of L4 is switchably coupled to the second antenna port.

The radio telephone further includes a second pair of transmission lines (L2 and L3) each having a first node coupled to an input/output port of the second transceiver. A second node of L2 is switchably coupled to the first antenna port and a second node of L3 is switchably coupled to the second antenna port. The switching is accomplished such that when the second node of L1 is coupled to the first antenna port, the second node of both L2 and L4 is open circuited and the second node of L3 is coupled to the second antenna port. When the second node of L2 is coupled to the first antenna port, the second node of both L1 and L3 is open circuited and the second node of L4 is coupled to the second antenna port.

The lengths of the transmission lines are as follows L1=L4=λ/2 for the first frequency band; and L2=L3=λ/2 for the second frequency band.

The first frequency band can include a frequency of about 800 MHz, for example the first transceiver may be used for duplex FM analog signals, and the second frequency band can include a frequency of about 1900 MHz, and may be used for TDMA, phase modulated signals.

In a further embodiment of this invention a first pair of transmission lines (L1 and L2) each has a first node coupled to the first antenna port, a second node of L1 is switchably coupled to the input/output port of the first transceiver, and a second node of L2 is switchably coupled to the input/output node of the second transceiver. A second pair of transmission lines (L3 and L4) each has a first node coupled to the second antenna port, a second node of L3 is switchably coupled to the input/output port of the first transceiver, and a second node of L4 is switchably coupled to the input/output node of the second transceiver. In this embodiment, when the second node of L1 is coupled to the input/output port of the first transceiver, the second node of both L2 and L3 is open circuited and the second node of L4 is coupled to the input/output port of the second transceiver. When the second node of L2 is coupled to the input/output port of the second transceiver, the second node of both L1 and L4 is open circuited and the second node of L3 is coupled to the input/output port of the first transceiver.

For this embodiment the lengths of the transmission lines are as follows: L2=L4=λ/2 for the first frequency band, and L1=L3=λ/2 for the second frequency band, such that the transmission line that is left open-ended has a length of λ/2 for the frequency band in use.

Further in accordance with this embodiment the second node of L1 and the second node of L3 are coupled through a first switch to the input/output port of the first transceiver, and the second node of L2 and the second node of L4 are coupled through a second switch to the input/output port of the second transceiver. In this case the first switch is selected to minimize an insertion loss for frequencies within the first frequency band, and the second switch is selected to minimize an insertion loss for frequencies within the second frequency band.

In a still further embodiment of this invention there is disclosed antenna switching circuitry for use in a radio telephone of a type that includes a transmitter operable in a first frequency band when transmitting and a receiver operable in a second frequency band when receiving. The radio telephone further includes a first antenna port and a second antenna port. In this embodiment the antenna switching circuitry includes a pair of transmission lines (L1 and L2) each having a first node and a second node. A first node of L2 is coupled to an input port of the receiver and a first node of L1 is coupled to an output port of the transmitter. Also included is a first switch having a first switching state for coupling the input port of the receiver to the first antenna port. The first switch further has a second switching state for coupling the output port of the transmitter to the first antenna port through the second node of L1. In the first switching state of the first switch the second node of L1 is open-circuited. Also included is a second switch that is operated in phase with the first switch, and that has a first switching state for coupling the output port of the transmitter to the second antenna port. The second switch further has a second switching state for coupling the input port of the receiver to the second antenna port through the second node of L2. In the first switching state of the second switch the second node of L2 is open-circuited. In this embodiment there is only one switch in series between one of the antenna ports and the input of the receiver or the output of the transmitter. The lengths of the transmission lines are as follows: L1=λ/2 for the second frequency band (transmit band) and L2=λ/2 for the first frequency band (receive band).

Also disclosed is an antenna switching arrangement for a dual band phone that eliminates a requirement for duplexers, while enabling individual ones of four switches to be separately optimized for their intended function (transit or receive) and also frequency band.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 5:
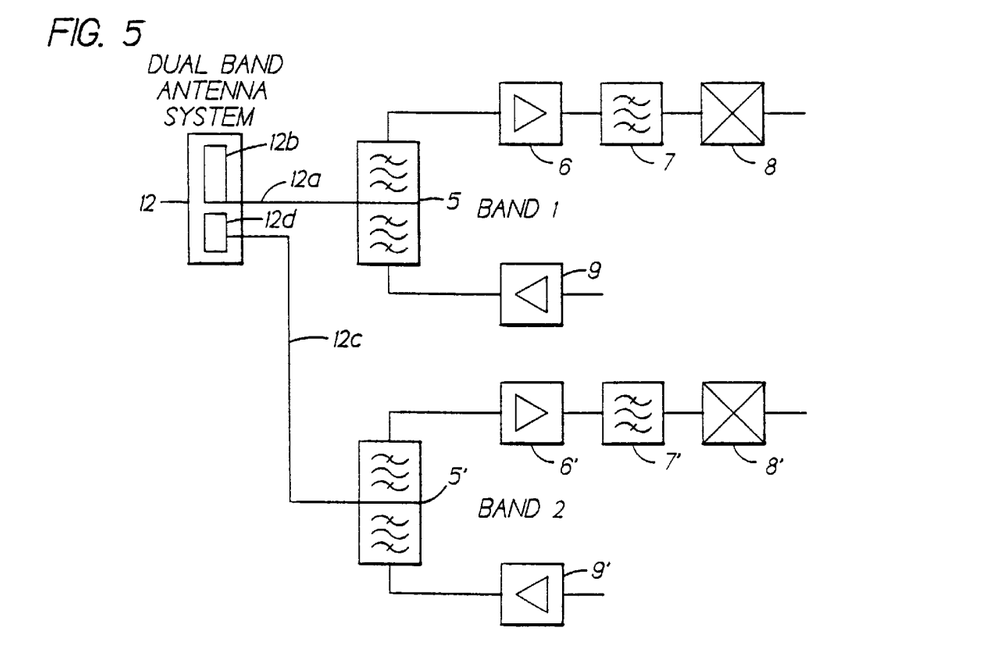
FIG. 5 illustrates a first embodiment of this invention that eliminates the antenna switch of FIG. 4 through the use of a single, dual band antenna with two feed lines.

FIG. 5 illustrates a first embodiment of this invention that eliminates the antenna switch of FIG. 3 through the use of a single, dual band antenna 12. In the embodiment of FIG. 5 there are two feedlines, preferably each having an impedance of 50 ohms. A first feedline 12a connects the Band 1 (e.g., 800 MHz analog) duplexer 5 to a first element 12b of the dual band antenna 12. A second feedline 12c connects the Band 2 (e.g., 1.9 GHz TDMA) duplexer 5' to a second element 12d of the dual band antenna 12. The elements 12b and 12d are each electrically optimized for operation in their respective bands, and may be disposed on a common antenna substrate or core and separated by a suitable dielectric material. The antenna elements 12b and 12d are so implemented that the electrical isolation between them is sufficiently high to prevent loading between the antenna ports of the dual band RF sections.

This embodiment eliminates the insertion loss due to the use of band or antenna switches, and thus also eliminates the need to compensate for the insertion loss with a higher transmitter power. Furthermore, since antenna band switching is accomplished without mechanical or electrical delays, it is well suited for use in applications where fast hand-offs between bands are required. Also, no antenna switching control signals need to be generated or routed, no additional printed circuit board area is required to implement the antenna band switching function, and no spurious responses are generated, since there are no nonlinear components involved. Also, the high degree of isolation between electrical antennas that can be achieved makes possible the use of conventional duplex or band filters in the antenna circuits on both bands. Also, the receiver sensitivity is improved since the absence of the switch insertion loss does not degrade the receiver noise figure.

Figure 6:
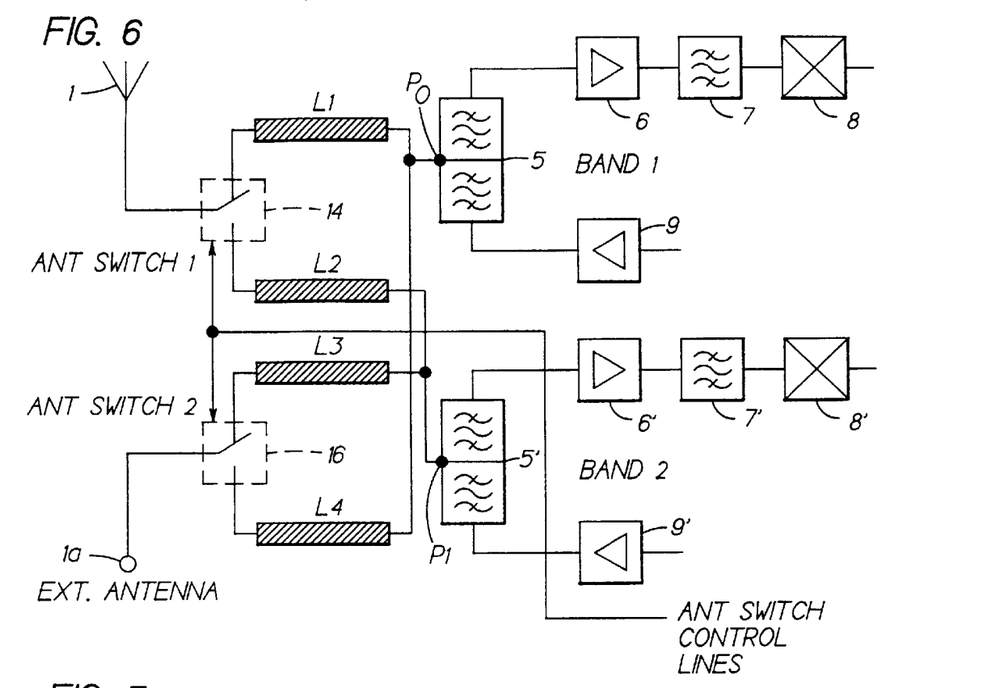
FIG. 6 illustrates one of the preferred embodiments of this invention that employs impedance matching lengths of transmission line to couple the duplexers to two antenna switches.

FIG. 6 illustrates one of the presently preferred embodiments of this invention that employs lengths of transmission line (L1–L4) to couple the duplexers 5 and 5' to two antenna switches 14 and 16. The embodiment of FIG. 6 thus overcomes the problems associated with the conventional approach shown in FIG. 4 for connecting to two different antennas, such as the integral antenna 1 and the external antenna connector 1a. Although the embodiment of FIG. 6 employs the two electronic switches 14 and 16 (or mechanical switches if so desired), there is only one switch in the RF signal path. As such, the insertion loss is not doubled as in the case of FIG. 4. The antenna 1 and the external antenna that is connected to the antenna connector 1a are assumed to be two-band antennas each having a single feedline. An external booster amplifier can also be coupled to the external antenna connector 1a if so desired.

When the antenna 1 is in use the unused band circuitry is always coupled to the external antenna connector 1a. If external antenna connector 1a is in use, then the unused band circuitry is always coupled to antenna 1. Preferably, the antenna impedance for both bands is 50 ohms. The lengths of the transmission lines L1–L4 from the duplex filters 5 and 5' to the antenna switches 14 and 16 are as follows:

L1=L4=$\lambda/2$ for the frequency of Band 1; and

L2=L3=$\lambda/2$ for the frequency of Band 2.

By example, and assuming that the frequency of Band 1 is 800 MHz and that the frequency of Band 2 is 1900 MHz, then the length of L1 and L4 can be about 95 mm, and the length of L2 and L3 can be about 45 mm. In the presently preferred embodiment of the invention L1–L4 are electrically conductive traces that are disposed on a printed circuit board dielectric substrate. The electrically conductive traces can be fabricated as meander lines, and their total lengths can be reduced through the use of lumped impedance elements to achieve the equivalent phase shift. With these dimensions the open end of the transmission lines reflects a high impedance at the duplex filter antenna ports P0 and P1.

As illustrated in FIG. 6, if it is desired to use the Band 1 circuitry with the antenna 1, or the Band 2 circuitry with the external antenna connector 1a, the lines L2 and L4 are open ended, and the signal path through switches 14 and 16 is to the antenna 1 for the Band 1 circuitry (through L1) and to the external antenna connector 1a for the Band 2 circuitry (through L3). If it is desired instead to use the Band 1 circuitry with the external antenna connector 1a, or the Band 2 circuitry with the antenna 1, then the antenna switch control line is energized to place the moveable contact of both switches 14 and 16 to the lower position. In this case the lines L1 and L3 are open ended, and the signal path through switches 14 and 16 is to the antenna 1 for the Band 2 circuitry (through L2) and to the external antenna connector 1a for the Band 1 circuitry (through L4).

Figure 7:
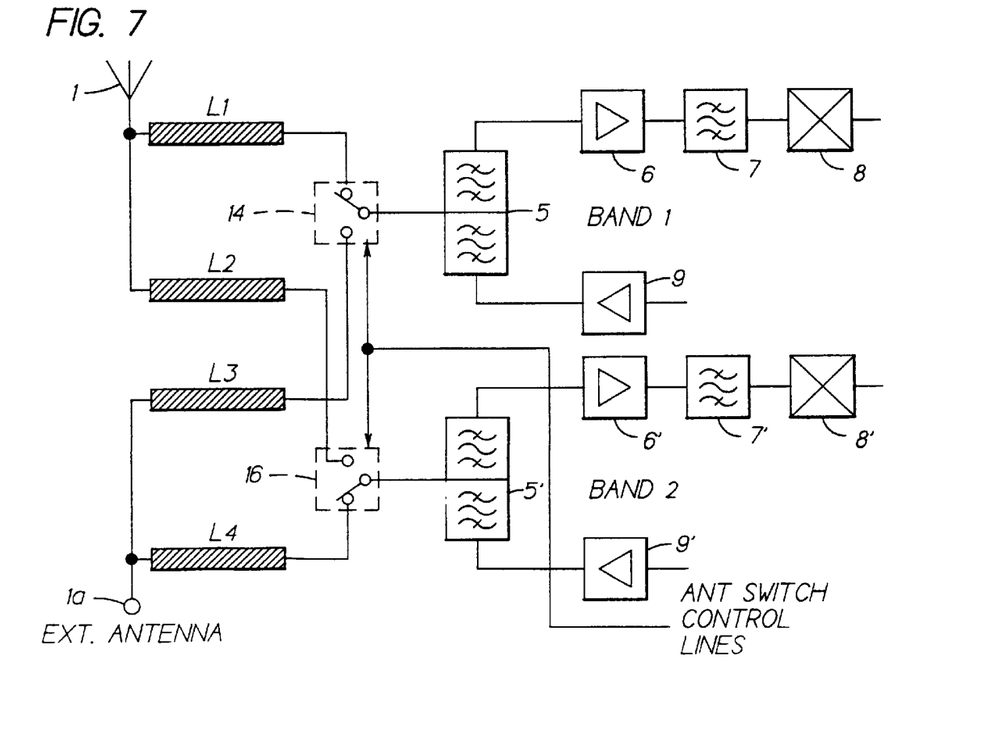
FIG. 7 illustrates a presently preferred embodiment of this invention that also employs impedance matching lengths of transmission line.

FIG. 7 illustrates a presently preferred embodiment of this invention that also employs the impedance matching lengths of transmission line (L1–L4). However, in FIG. 7 the switches 14 and 16 are moved so as to be located between the lengths of transmission line and the duplexers 5 and 5'. In addition, and as is shown, the switches 14 and 16 are operated out of phase.

The lengths of the transmission lines L1–L4 between the antenna ports and the switches in the embodiment of FIG. 7 are as follows:

L2=L4=$\lambda/2$ for the frequency of Band 1; and

L1=L3=$\lambda/2$ for the frequency of Band 2.

As illustrated in FIG. 7, if it is desired to use the Band 1 circuitry with the antenna 1, or the Band 2 circuitry with the external antenna connector 1a, the lines L2 and L3 are open ended, and the signal path through switches 14 and 16 is to the antenna 1 for the Band 1 circuitry (through L1) and to the external antenna connector 1a for the Band 2 circuitry (through L4). If it is desired instead to use the Band 1 circuitry with the external antenna connector 1a, or the Band 2 circuitry with the antenna 1, then the antenna switch control line is energized to place the moveable contact of switch 14 to the lower position and the moveable contact of switch 16 to the upper position. In this case the lines L1 and L4 are open ended, and the signal path through switches 14 and 16 is to the antenna 1 for the Band 2 circuitry (through L2) and to the external antenna connector 1a for the Band 1 circuitry (through L3).

It should be noted that, in the embodiment of FIG. 7, the switch 14 is only required to carry the frequency of the Band 1 signal, while the switch 16 is only required to carry the frequency of the Band 2 signal. For the example where the Band 1 frequency is about 800 MHz and the Band 2 frequency is about 1900 MHz, it can be appreciated that the switches 14 and 16 can be separately optimized for their respective frequency bands. That is, a single switch that is selected for a minimum insertion loss at 800 MHz may exhibit a higher loss at 1900 MHz. The embodiment of FIG. 7 avoids this potential problem by enabling both switches to be separately specified for their respective frequency bands. As such, for many applications the embodiment of FIG. 7 may be preferred over the embodiment of FIG. 6.

The presently preferred embodiment of this is not limited for use only with a FM/TDMA phase modulated (AMPS/TDMA) dual band mobile phone, but can be used as well with, by example, an AMPS/CDMA mobile phone, as well as with an AMPS/NAMPS/CDMA mobile phone.

Figure 10:
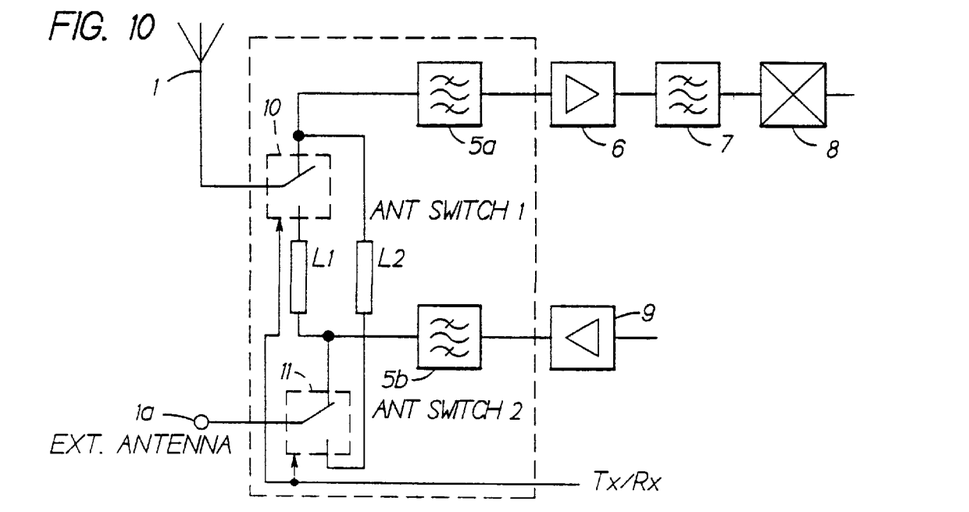
FIG. 10 illustrates a preferred embodiment of this invention for coupling to one of two antennas in a single band mobile phone, and that also employs the impedance matching lengths of transmission line.
Figure 11A:
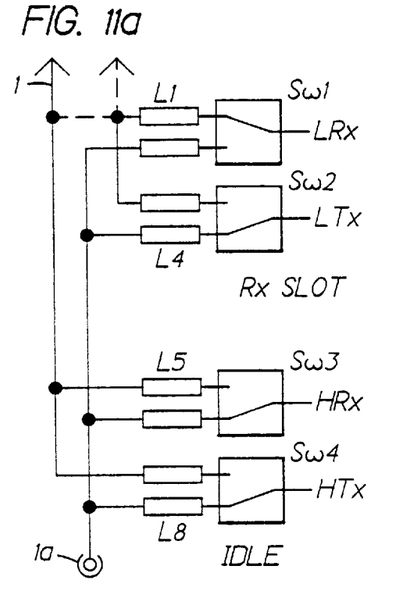
FIGS. 11a and 11b illustrate a switching arrangement for a lower frequency band using the integral antenna for a receive slot and a transmit slot, respectively.
Figure 11B:
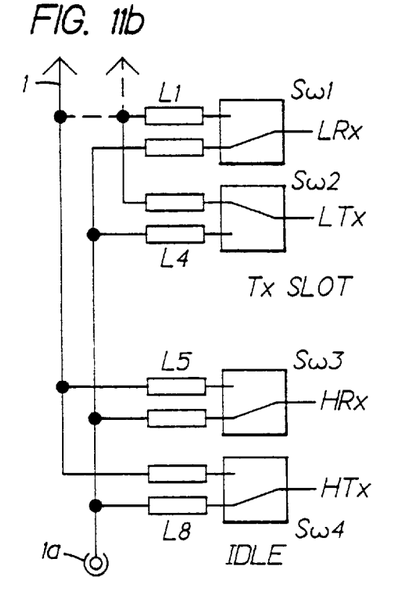

Furthermore, and referring to FIG. 10, the teaching of this invention applies as well to single band mobile phones, such as digital (e.g., TDMA) mobile phones that transmit at one time in one band of frequencies and that receive at another time in another band of frequencies. In FIG. 10 only one control signal is employed as compared to the embodiment of FIG. 9, and the lengths of transmission line L1 and L2 are connected as shown. When operating with the integral antenna 1 the antenna switches 10 and 11 are operated in phase to couple the integral antenna 1 to the receiver 6 through switch 10 when receiving (the illustrated position) and to couple the integral antenna 1 to the transmitter 9, through switch 10 and L1, when transmitting. The unused transmitter is coupled to the external antenna coupler 1a through switch 11 when receiving, and the unused receiver is coupled to the external antenna coupler 1a through switch 11 and L2 when transmitting. When operating with the external antenna the polarity of the control signal is reversed, the receiver or transmitter in use is coupled to the external antenna coupler 1a, and the unused receiver or transmitter is coupled to the integral antenna 1. In either case there is only one electronic switch in the receive or transmit path to the active antenna, and thus the insertion loss is about one half of the insertion loss of the embodiment of FIG. 9.

The lengths of the transmission lines L1 and L2 from the filters 5a and 5b in the embodiment of FIG. 10 are as follows:

L1=$\lambda/2$ for the transmit band of frequencies; and

L2=$\lambda/2$ for the receive band of frequencies.

Figure 8:
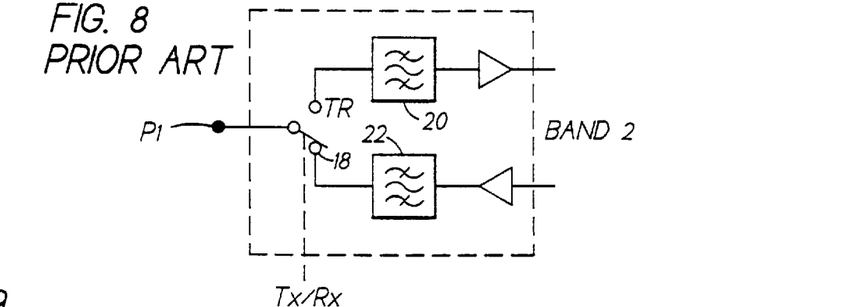
FIG. 8 illustrates a conventional circuit that can be employed in the embodiment of FIGS. 6 and 7 in place of the Band 2 (TDMA) duplexer.

As is illustrated in FIG. 8 for the case where, by example, the Band 2 is a TDMA band, the duplexer 5' can be replaced with a TR switch 18, a receive filter 20, and a transmit filter 22. The TR switch 18 is controlled with a TX/RX signal for setting the switch to either couple the receiver front end or the transmitter power amplifier output to the node P1. Such an arrangement is known in the prior art, and can be used to replace a conventional duplex filter in a TDMA mobile phone. Since the filtering requirements for the TX and RX band filters in TDMA mobile phones are not as stringent as in the case analog mode mobile phones, it is possible to achieve an adequate level of performance with this arrangement. This circuit can replace the duplex filter 5' in FIGS. 3, 4, 5, 6 and 7. If Band 1 is also a TDMA-only band, then the duplex filter 5 in the above mentioned Figures can also be replaced with this circuit.

Reference is now made to FIGS. 11a, 11b, 12a, 12b, 13a, 13b, 14a and 14b for illustrating, in accordance with a further embodiment of this invention, preferred antenna switching circuitry for a dual band TDMA-based digital cellular phone. It should be noted that the same concepts may be used also in a single band mobile phones, although the advantages are not as great.

In FIGS. 11–14 the following nomenclature is used: LRx=lower band receiver; LTx=lower band transmitter; HTx=upper band receiver; and HTx=upper band transmitter.

In accordance with this aspect of the invention there are four (in a single-band phone two) solid state RF switches. The switches are connected so that there is only one switch between the selected antenna and the transmitter or receiver. This embodiment of the invention eliminates the use of the duplex filters, and therefore the insertion loss is very low. Reducing the insertion loss can provide an increase in the total talk time of the mobile phone before the battery is required to be recharged.

The switches are controlled synchronously so that only the receiver is connected to a selected antenna during the RX time slot and only the transmitter is connected to the selected antenna during the TX time slot. All the other circuits are disconnected from the antenna when not being used (idle).

The open switches are matched so that they are seen as a high impedance from the active signal path. This can be accomplished using, by example, transmission lines (e.g., microstrips) having a length of $n*\lambda/2$ ($\lambda$=wavelength in that line) between the circuits (see FIGS. 11a and 11b). The transmission line can be eliminated if the distance between switches is very short, e.g., if they are integrated into the same integrated circuit package. In this case the switches could share some IC pins.

This embodiment of the invention is particularly useful for systems where the frequency of the higher band is a multiple of the frequency of the lower band, e.g. GSM (900 Mhz) and PCN (1800 MHz). By example, the PCN frequency band is approximately two times that of the GSM frequency band, so transmission lines having lengths of L=$2*\lambda/2$ for PCN and L=$1*\lambda/2$ for GSM can be used.

In that only a transmitted or a received signal goes through any one switch, the switches may be optimized for best performance. By example, the transmission switches can be selected for high power operation, while the reception switches can be selected for low noise and small size. Furthermore, the insertion loss and bandwidth of the switches can be minimized since both the high and low bands have their own associated non-shared switches.

Figure 12A:
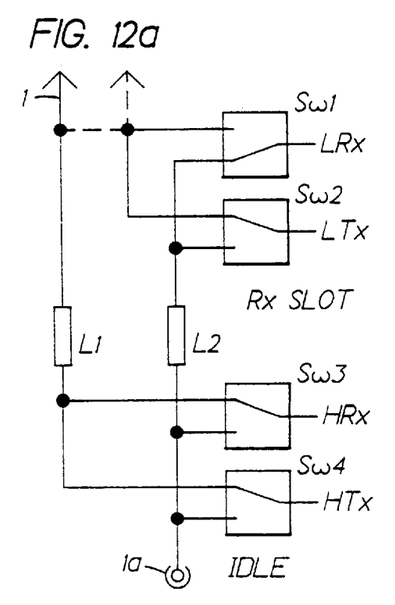
FIGS. 12a and 12b illustrate a switching arrangement for the lower frequency band using the external antenna for the receive slot and the transmit slot, respectively.
Figure 12B:
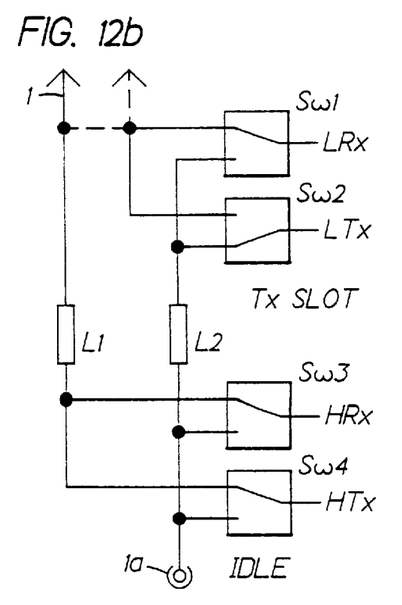
Figure 13A:
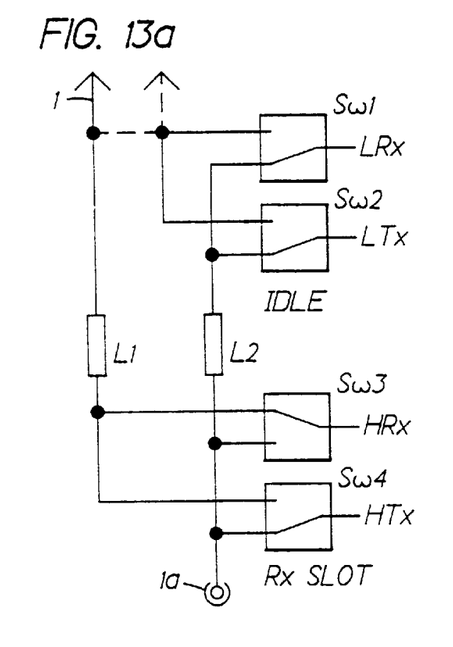
FIGS. 13a and 13b illustrate a switching arrangement for an upper frequency band using the integral antenna for the receive slot and the transmit slot, respectively.
Figure 13B:
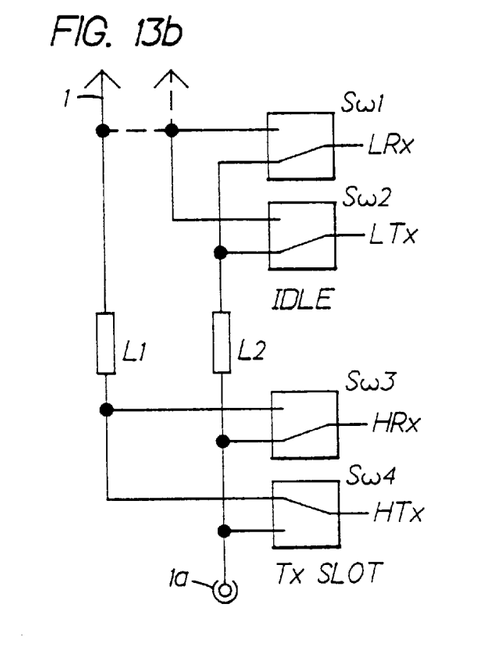
Figure 14A:
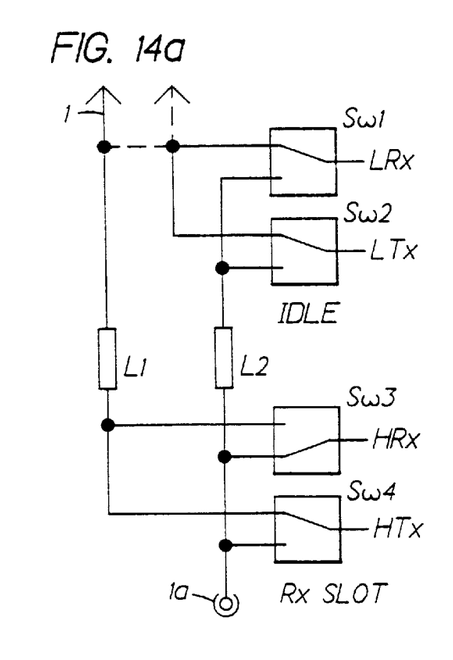
FIGS. 14a and 14b illustrate a switching arrangement for the upper frequency band using the external antenna for the receive slot and the transmit slot, respectively.
Figure 14B:
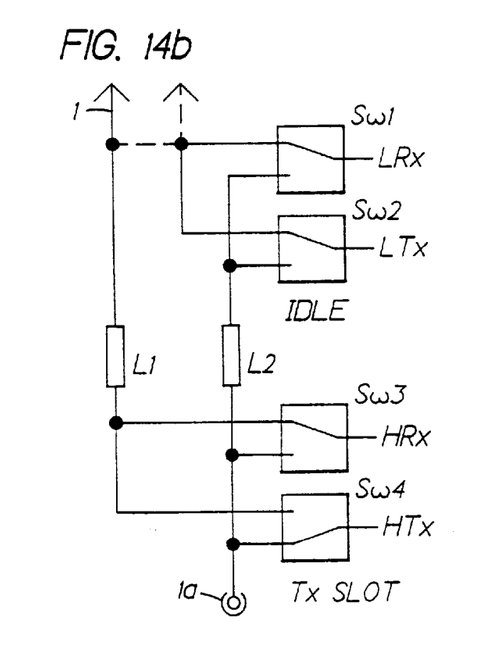

FIGS. 11–14 illustrate all possible switch positions for both bands when either receiving or transmitting with either the mobile phone's own (integral) antenna or the external antenna. In FIGS. 11a and 11b it has been assumed that the switches are spaced apart by a distance that requires the use of the above-mentioned transmission lines (designated as L1–L8) for each switch. In FIGS. 12–14 it is been assumed that the lower band switches are very near to each other, and that the high band switches are also near each other. In this case the transmission lines L1 and L2 are located only between the low and high band switches. There may be two separate antennas or one combined dual band antenna in the mobile phone.

The switching arrangements shown in FIGS. 11–14 insure that the mobile phone's integral antenna is switched off to reduce loss and unwanted radiation when using the external antenna (such as when using the antenna of a vehicle). Furthermore, during reception the transmitter is disconnected from the antenna to reduce insertion loss, while during transmission the receiver is disconnected from the antenna to reduce the insertion loss and to provide for a simpler input filtering arrangement. In addition, it should be noted that the embodiments of FIGS. 11–14 eliminate the need for a conventional duplex filter while also eliminating any serially coupled switches and the inherent higher insertion loss. This embodiment of the invention thus provides a low insertion loss and less complex antenna coupling arrangement for a digital dual band phone. As was indicated above, and as in several of the other embodiments of this invention, the individual switches can each be optimized for reception or transmission within their respective frequency bands.

While the invention has been particularly shown and described with respect to preferred embodiments thereof, it will be understood by those skilled in the art that changes in form and details may be made therein without departing from the scope and spirit of the invention.

What is claimed is:

1. Antenna switching circuitry for use in a radio telephone of a type that includes a transmitter operable in a first frequency band when transmitting and a receiver operable in a second frequency band when receiving, the radio telephone further comprising a first antenna port and a second antenna port, said antenna switching circuitry comprising:

a pair of transmission lines (L1 and L2) each having a first node and a second node, a first node of L2 being coupled to an input port of said receiver and a first node of L1 being coupled to an output port of said transmitter;

a first switch having a first switching state for coupling said input port of said receiver to the first antenna port, the first switch further having a second switching state for coupling said output port of said transmitter to the first antenna port through the second mode of L1, wherein in the first switching state of the first switch the second node of L1 is open-circuited; and a second switch operated in phase with the first switch and having a first switching state for coupling said output port of said transmitter to the second antenna port, said second switch further having a second switching state for coupling said input port of said receiver to the second antenna port through the second node of L2, wherein in the first switching state of the second switch the second node of L2 is open-circuited.

2. Antenna switching circuitry as set forth in claim 1, wherein the lengths of said transmission lines are as follows:

L1=$\lambda/2$ for the first frequency band; and

L2=$\lambda/2$ for the second frequency band.

3. Antenna switching circuitry as set forth in claim 1, wherein the first antenna port is coupled to an integral antenna, and wherein said second antenna port is for coupling to an external antenna.

* * * * *